(12) United States Patent
Hite

(10) Patent No.: US 12,271,336 B2
(45) Date of Patent: Apr. 8, 2025

(54) TERNARY LOGIC BASED DATA COMMUNICATION INTERFACE

(71) Applicant: Bradford T Hite, Valencia, CA (US)

(72) Inventor: Bradford T Hite, Valencia, CA (US)

( * ) Notice: Subject to any disclaimer, the term of this patent is extended or adjusted under 35 U.S.C. 154(b) by 39 days.

(21) Appl. No.: 18/297,848

(22) Filed: Apr. 10, 2023

(65) Prior Publication Data

US 2024/0338336 A1    Oct. 10, 2024

(51) Int. Cl.
*G06F 13/42*    (2006.01)

(52) U.S. Cl.
CPC .. *G06F 13/4282* (2013.01); *G06F 2213/0002* (2013.01)

(58) Field of Classification Search
CPC ............... G06F 7/49; G06F 2213/0002; G06F 13/4282; G05B 2219/15128
See application file for complete search history.

(56) References Cited

U.S. PATENT DOCUMENTS

| | | | | |
|---|---|---|---|---|
| 3,660,678 | A * | 5/1972 | Maley ................ | H03K 19/0823 326/124 |
| 4,107,549 | A * | 8/1978 | Moufah ........... | H03K 19/09425 326/59 |
| 10,985,954 | B1 * | 4/2021 | Kim ..................... | H04L 25/028 |
| 2009/0092212 | A1 * | 4/2009 | Ko ........................ | H04L 7/0037 375/360 |
| 2010/0054346 | A1 * | 3/2010 | Fukuda .................... | H04L 7/06 375/257 |
| 2015/0341160 | A1 * | 11/2015 | Takai ................ | H04L 25/0274 375/346 |
| 2016/0124896 | A1 * | 5/2016 | Pitigoi-Aron ......... | G06F 13/364 710/110 |
| 2021/0295978 | A1 * | 9/2021 | Sowards .............. | A61B 8/0833 |
| 2022/0045777 | A1 * | 2/2022 | Amicangioli ......... | H04J 3/0667 |
| 2022/0407520 | A1 * | 12/2022 | Kim ...................... | H03K 19/08 |

\* cited by examiner

*Primary Examiner* — Phong H Dang

(57) ABSTRACT

A unique ternary logic based digital data communication interface between devices is described. The invention makes use of the additional logic states available within a ternary representation to implement a communication interface with self clocking and integrated multi-mode operation. Another improvement the invention provides is an increased data rate possible over existing transmission media connections. The invention concept has applications to both serial and parallel communication interface types. A single ended serial interface configuration is described using ternary signaling to encode data plus an inserted clock phase to support self clocking operation. A differential serial interface configuration is described using ternary signaling to encode multi-bit data plus both a clock phase and an idle mode state. Finally, a ternary encoded parallel bus interface configuration is described as an improvement over binary encoding allowing: self clocking, idle mode and a reduction in the number of transmission media elements.

11 Claims, 12 Drawing Sheets

Single Ended Serial Transmission System Block Diagram

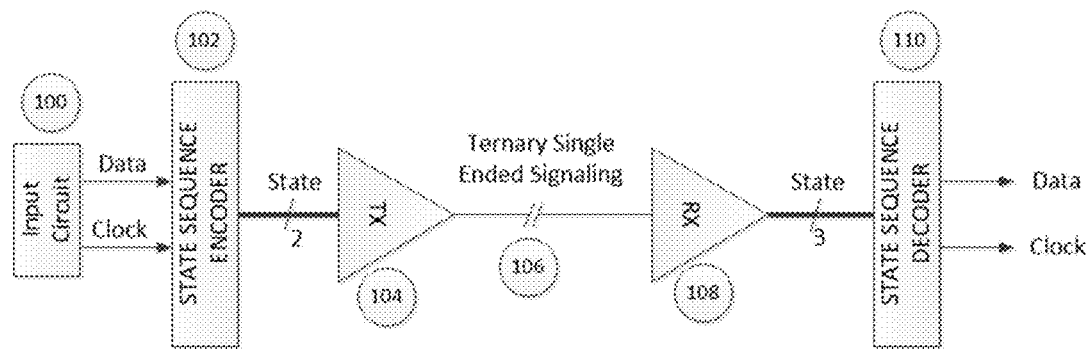
FIG 1 – Single Ended Serial Transmission System Block Diagram
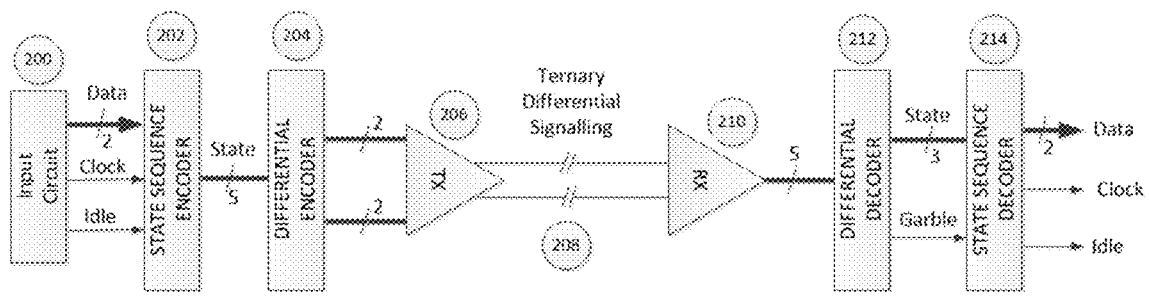
FIG 2 – Differential Serial Transmission System Block Diagram

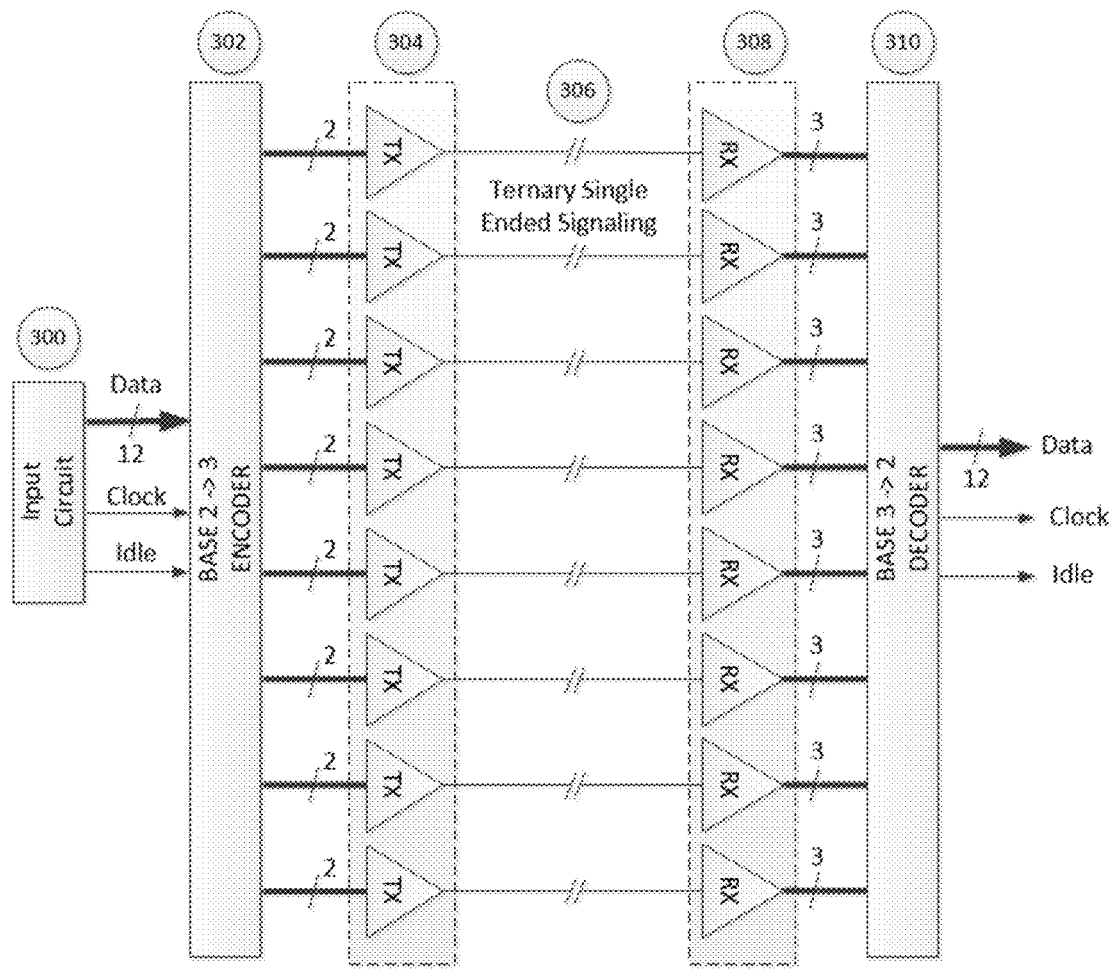
FIG 3 – Parallel Transmission System Block Diagram

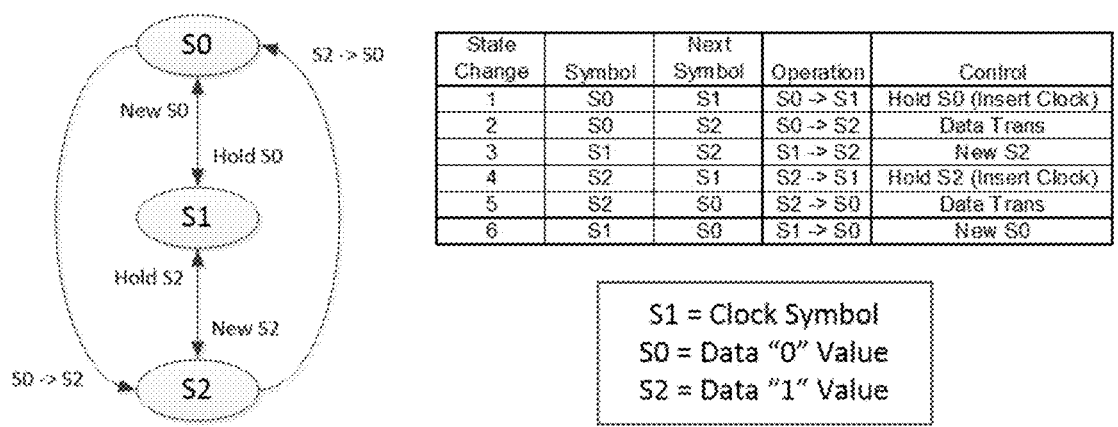
FIG 4 – Single Ended TX Encoder and RX Decoder State Machine

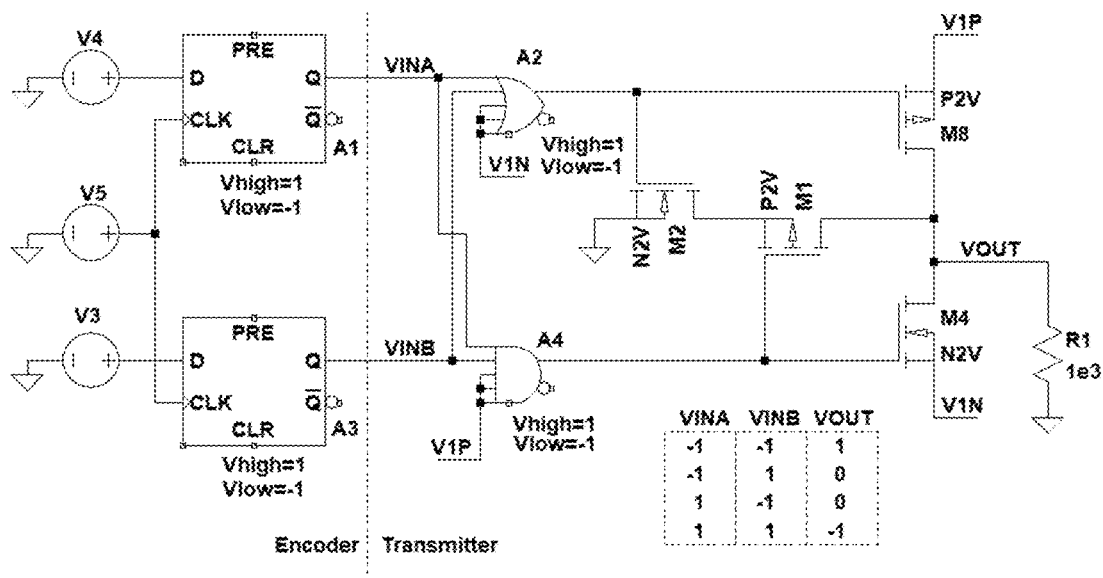
FIG 5 – Single Ended Transmitter Example Circuit

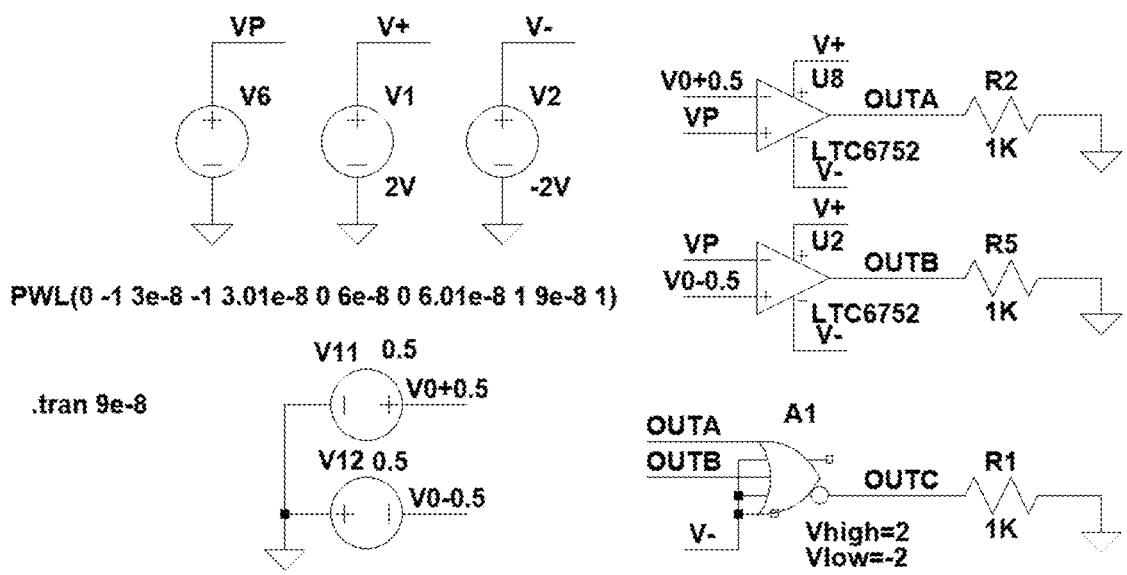
FIG 6 – Single Ended Receiver Example Circuit

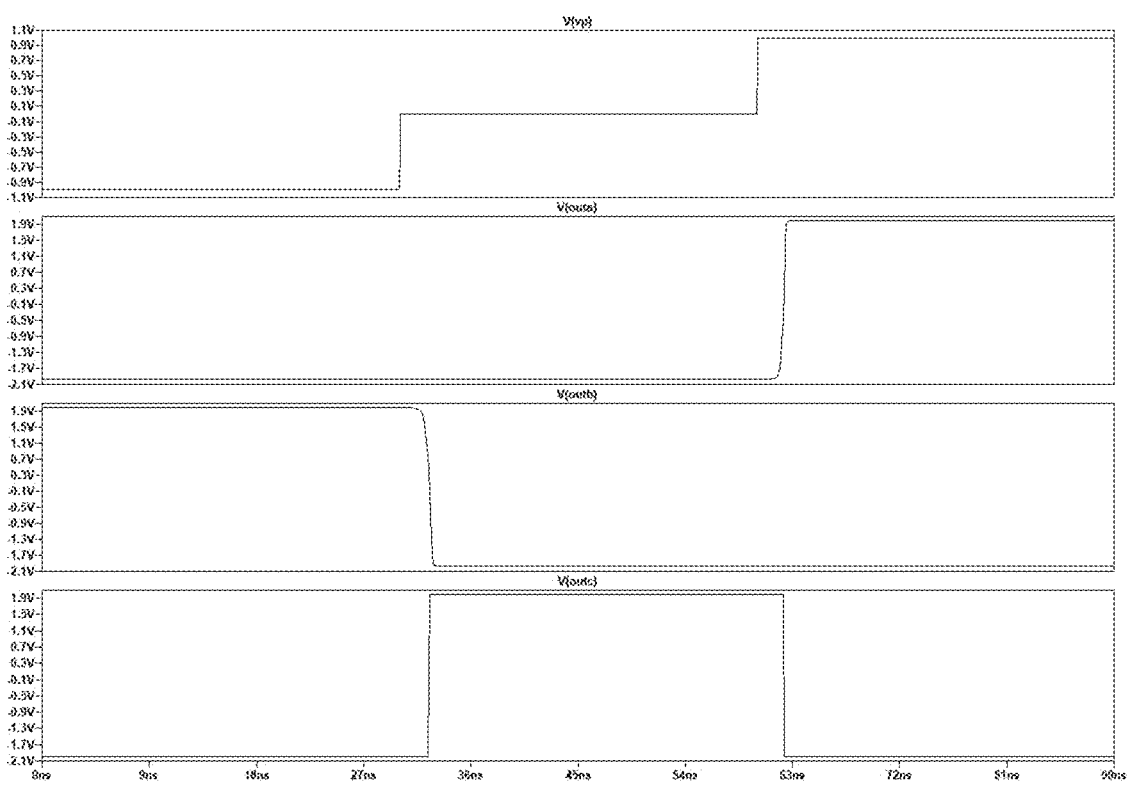
FIG 7 – Single Ended Example Circuit Waveforms

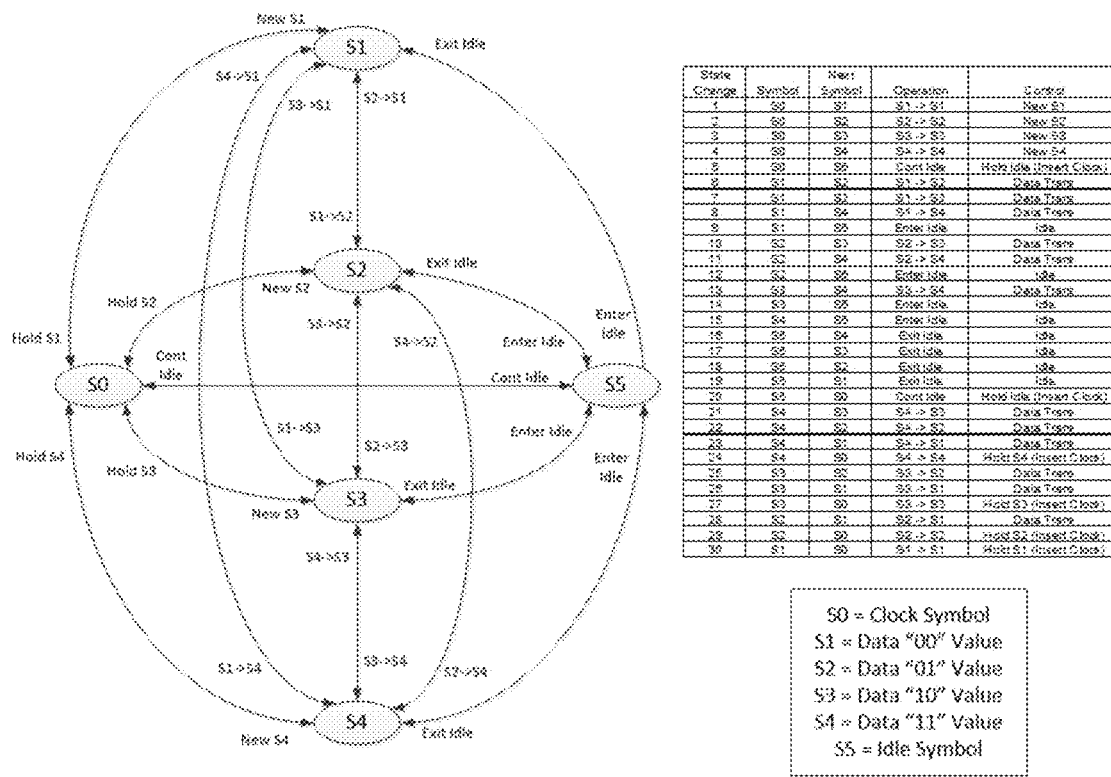
FIG 8 – Differential TX Encoder and RX Decoder State Machine

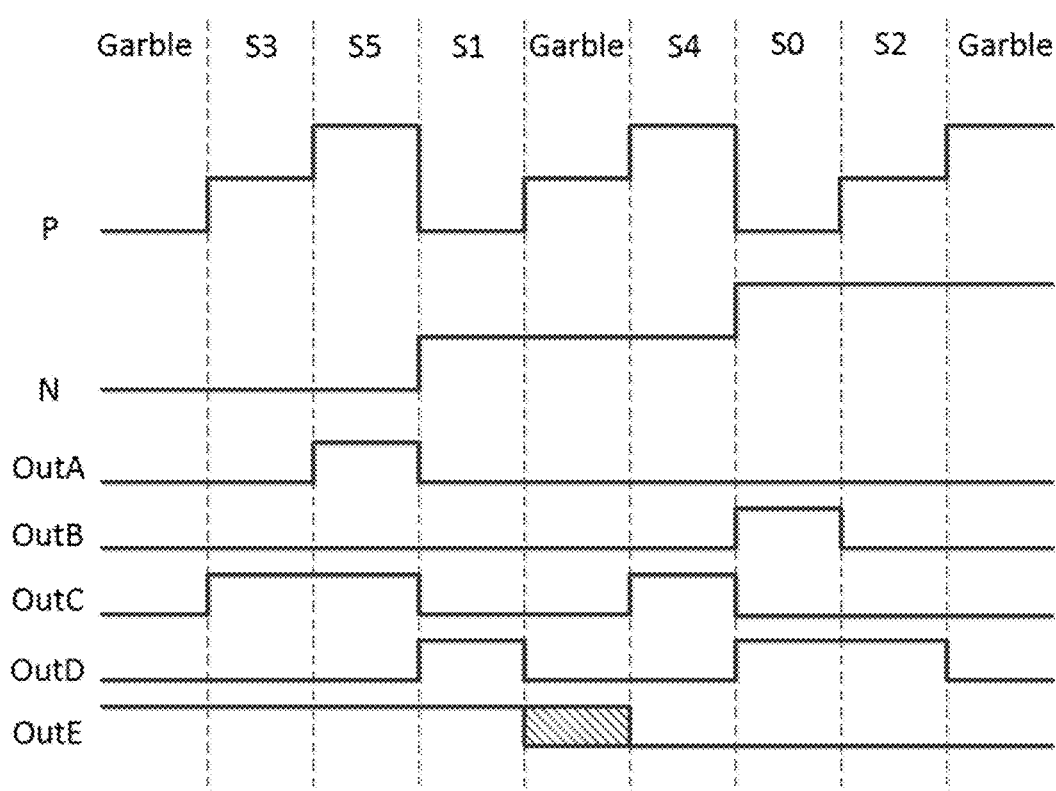
FIG 9 – Differential Receiver State Mapping

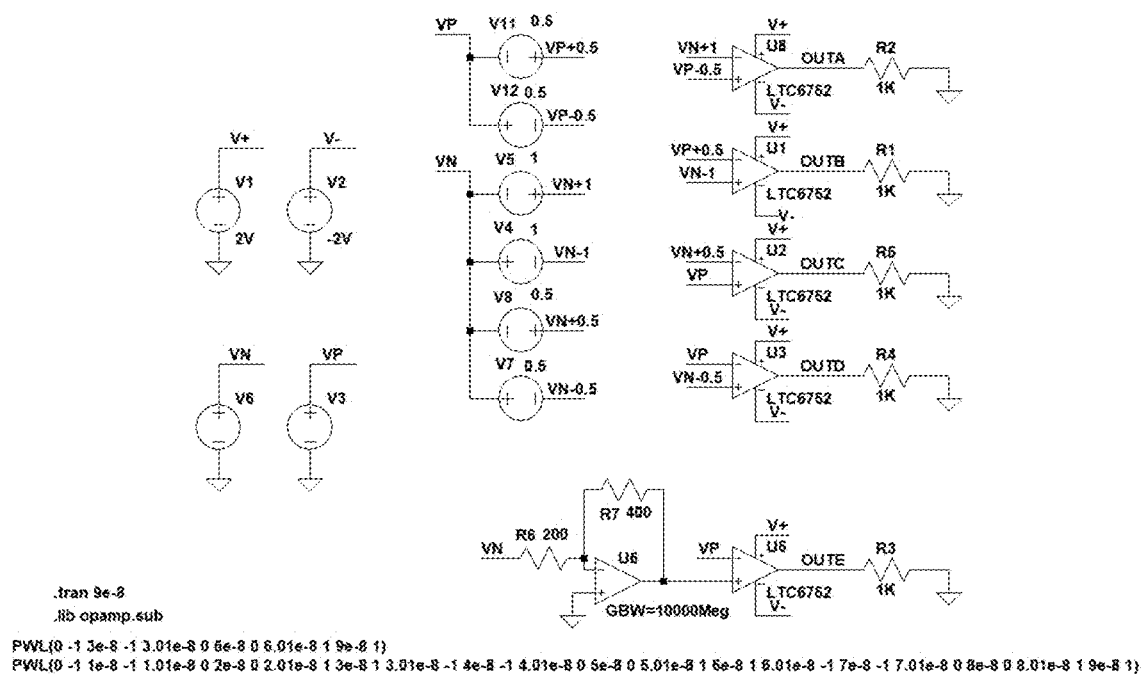
FIG 10 – Differential Receiver Example Circuit

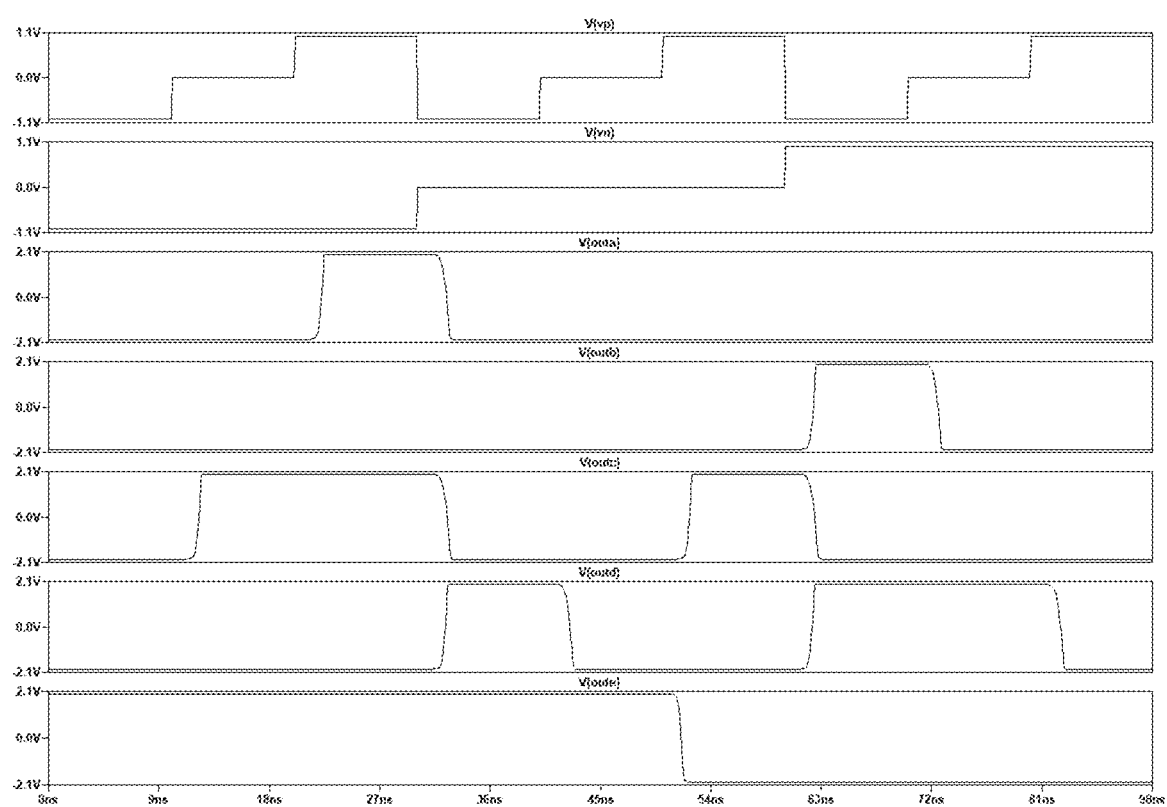
FIG 11 – Differential Example Circuit Waveforms

| Digits | Base2 States | Base3 States | Base2 Mapped Digits |
|---|---|---|---|
| 1 | 2 | 3 | 2 |
| 2 | 4 | 9 | 3 |
| 3 | 8 | 27 | 4 |
| 4 | 16 | 81 | 6 |
| 5 | 32 | 243 | 7 |
| 6 | 64 | 729 | 9 |
| 7 | 128 | 2187 | 11 |
| 8 | 256 | 6561 | 12 |
| 9 | 512 | 19683 | 14 |
| 10 | 1024 | 59049 | 15 |
| 11 | 2048 | 177147 | 17 |
| 12 | 4096 | 531441 | 18 |
| 13 | 8192 | 1594323 | 20 |
| 14 | 16384 | 4782969 | 22 |
| 15 | 32768 | 14348907 | 23 |
| 16 | 65536 | 43046721 | 25 |
| 17 | 131072 | 129140163 | 26 |
| 18 | 262144 | 387420489 | 28 |
| 19 | 524288 | 1162261467 | 30 |
| 20 | 1048576 | 3486784401 | 31 |
| 21 | 2097152 | 10460353203 | 32 |
| 22 | 4194304 | | |
| 23 | 8388608 | | |
| 24 | 16777216 | | |
| 25 | 33554432 | | |
| 26 | 67108864 | | |
| 27 | 134217728 | | |
| 28 | 268435456 | | |
| 29 | 536870912 | | |
| 30 | 1073741824 | | |
| 31 | 2147483648 | | |
| 32 | 4294967296 | | |

FIG 12 – Base3 versus Base2 Digit Mapping

| State | TXPA | TXPA | TXNA | TXNB | P | N |
|---|---|---|---|---|---|---|
| S0 | H | H | L | L | -1 | +1 |
| S1 | H | H | H | L | -1 | 0 |
| S2 | H | L | L | L | 0 | +1 |
| S3 | H | L | H | H | 0 | -1 |
| S4 | L | L | H | L | +1 | 0 |
| S5 | L | L | H | H | +1 | -1 |

FIG 13 – Differential TX Encoder Mapping

| P | N | OutA | OutB | OutC | OutD | OutE | Garble | State |
|---|---|---|---|---|---|---|---|---|
| -1 | +1 | L | H | L | H | L | L | S0 |
| -1 | 0 | L | L | L | H | H | L | S1 |
| 0 | +1 | L | L | L | H | L | L | S2 |
| 0 | -1 | L | L | H | L | H | L | S3 |
| +1 | 0 | L | L | H | L | L | L | S4 |
| +1 | -1 | H | L | H | L | H | L | S5 |
| -1 | -1 | L | L | L | L | X | H | G1 |
| 0 | 0 | L | L | L | L | X | H | G2 |
| 1 | 1 | L | L | L | L | X | H | G3 |

FIG 14 – Differential RX Decoder Mapping

TERNARY LOGIC BASED DATA COMMUNICATION INTERFACE

CROSS-REFERENCES TO RELATED APPLICATIONS

Not Applicable.

STATEMENT REGARDING FEDERALLY SPONSORED RESEARCH OR DEVELOPMENT

Not Applicable.

REFERENCE APPENDICES

Not Applicable

BACKGROUND OF THE INVENTION

1. Field of the Invention

This invention relates to the field of ternary (base 3) logic interfaces utilized for digital data communication between devices. Usage of the additional logic states available within a ternary logic representation allows a communication interface to be self clocking and integrate multi-mode operation. One other improvement the invention can provide is an increased data rate possible over existing transmission media connections. This data rate improvement is achieved by effectively mapping more data onto an interface which would normally be designed to support a binary logic representation.

2. Description of the Related Art

The field of ternary logic electrical circuits can be traced back to the 1960's and 1970's as academic type research. Much of this research was aligned with purpose of building a ternary (base 3) logic based computer as an alternate to the more common binary (base 2) design. Early field of study academic work in the areas of theory and circuit configuration was performed by Hu (1967) and Khabushani (1973). Some of the earliest patents were also issued during the mid 1970's for electrical circuit designs under U.S. Pat. No. 36,660,678 IBM 1972 and U.S. Pat. No. 4,107,549 Moufah 1978. A later academic effort to refine the higher power bipolar transistor circuits to a lower power CMOS type circuit was performed by Wu (1990).

In recent years, a focus of design implementation has been to utilize the numerical efficiency provided by ternary signaling to improve optimal data coding. Other authors have investigated the implementation of ternary logic circuits using modern integrated circuit manufacturing methods. One particular publication from Madsen 1995 (IEEE International Symposium on Multiple Valued Logic) describes a ternary encoded serial data link whereby every data value is separated by a spacer character to provide clocking. This is different from the present invention in which a clock phase state is inserted only for repeated data values thereby offering no reduction in maximum transfer speed.

BRIEF SUMMARY OF THE INVENTION

The present invention comprises a system for transferring digital data using ternary signaling to improve interface efficiency. The ternary signal representation allows additional logic states to be utilized for interface operational control while maintaining a maximum data rate. These additional logic states take the form of a clock phase and/or idle state for the purpose of a self clocking interface. Another benefit of the invention is the ability to send multi-bit data codes over the same transmission media normally supporting a single-bit data code. This aspect allows the upgrade of existing media connections to support a higher transmission data rate as enabled by the invention.

The invention can encompass multiple embodiments depending on performance or implementation goals. Specific examples of a single ended, differential and parallel interface are described which can be expanded thru additional complexity.

BRIEF DESCRIPTION OF THE DRAWINGS

FIG. 1 is a block diagram for a single ended serial transmission system block diagram based on the present invention.

FIG. 2 is a block diagram for a differential serial transmission system based on the present invention.

FIG. 3 is a block diagram for a parallel transmission system based on the present invention.

FIG. 4 is the state diagram for a single ended TX encoder and single ended RX decoder state machine.

FIG. 5 is a schematic view showing the electrical blocks and signal flow between blocks for a single ended transmitter example circuit.

FIG. 6 is a schematic view showing the electrical blocks and signal flow between blocs for a single ended receiver example circuit.

FIG. 7 is electrical simulation (SPICE) modeling showing time domain operation of the schematic circuit from FIG. 6.

FIG. 8 is the state diagram for a differential TX encoder and differential RX encoder State Machine.

FIG. 9 is a timing diagram showing differential receiver output signals to state mapping.

FIG. 10 is a schematic view showing the electrical blocks and signal flow between blocks for a differential receiver example circuit.

FIG. 11 is electrical simulation (SPICE) modeling showing time domain operation of the schematic circuit from FIG. 10.

FIG. 12 is numerical representation showing Base3 versus Base2 digit mapping for a parallel interface.

FIG. 13 is a logic table for the differential TX encoder mapping.

FIG. 14 is a logic table for the differential RX decoder mapping.

REFERENCE NUMERALS IN THE DRAWINGS

| 100 | Input Circuit | 102 | State Sequence Encoder |
|---|---|---|---|
| 104 | Single Ended Ternary Transmitter | 106 | Signal Transmission Media |
| 108 | Single Ended Ternary Receiver | 110 | State Sequence Decoder |
| 200 | Input Circuit | 202 | State Sequence Encoder |
| 204 | Differential Ternary Encoder | 206 | Differential Ternary Transmitter |
| 208 | Signal Transmission Media | 210 | Differential Ternary Receiver |
| 212 | Differential Ternary Decoder | 214 | State Sequence Decoder |
| 300 | Input Circuit | 302 | Parallel Binary to Ternary Encoder |
| 304 | Ternary Transmitter | 306 | Signal Transmission |

| | Group | | Media |
|---|---|---|---|
| 308 | Ternary Receiver Group | 310 | Parallel Ternary to Binary Decoder |

DETAILED DESCRIPTION OF THE INVENTION

The preferred embodiment of the present invention is detailed in system block diagram FIG. 1 showing functional components and signal interconnects. FIG. 1 shows a ternary signal based data communications interface using a single ended electrical connection between transmitter and receiver. The single ended connection consisting of an active line and ground reference line similar to RS232. Input circuit 100 generates a serial binary data stream and clock. Input circuit 100 can be any type of device or circuit capable generating a digital data stream including but not limited to a computer, cellular phone, digital radio or telecommunications equipment. State sequence encoder 102 takes as input a binary data line and clock signals converting data into a sequential pattern of ternary symbols. FIG. 4 provides details as to the encoding function performed by state encoder 102. A single ternary signal can be represented by any three logic voltage levels, for example −1/0/1 or 0/1/2. In this example, the binary data is represented states S0 and S2 with an additional clock phase state as S1. The clock phase state is used to implement a self clocked interface whereby each state change represents a new state. In the event a sequence of multiple repeated data states S0's or S2's is transmitted, the inserted clock phase state allows the interface receiver to detect the multiple repeated separate data states. An example would be the transmission of four sequential S0 states across the interface. Without the inserted clock phase state this pattern would simply consist of S0→S0→S0→S0 appearing as a long period of inactivity by the interface. Insertion of the clock state changes the pattern to S0→S2→S0→S2 thereby allowing the receiver to detect four separate S0 symbols. FIG. 4 shows each different type of state transitions necessary to control the interface self clocked operation. In this example the following ternary signaling levels are used for each state: −1V=S0, 0V=S1 and 1V=S2.

Following the determination of a state sequence by encoder 102, ternary single ended transmitter 104 drives the active line to a required signal level. Ternary transmitter 104 can be any type of device or circuit capable modulating a signal including but not limited to a line driver, RF modulator or laser. This signal transits across the signaling media 106 ending at ternary single ended receiver 108. Signaling media 106 can be any type of physical connection media with capability to carry the signal including but not limited to wire, circuit board trace, fiber optic or free space. Ternary receiver 108 reads the input signal level and determines the current state transmitted across media 106. Examples of a ternary receiver include but are not limited to a line receiver, RF receiver or photo detector. After the state is determined, state sequence decoder 110 utilizes the mapping shown in FIG. 4 to output data values and clock.

FIG. 5 shows an example electrical circuit implementing a single ended ternary transmitter. The output stage consisting of M1, M22, M4 and M8 is a CMOS configuration detailed by Wu in 1990. Gates A2 and A4 are added to eliminate the condition whereby V1P is shorted to VIN through M4 and M8. Register D-flops A1 and A3 are shown for completeness in order to detail the transmitter clock synchronization. The logic table from FIG. 5 shows the relationship between binary inputs VINA and VINB to ternary transmitter output VOUT.

FIG. 6 shows an example electrical circuit implementing a single ended ternary receiver. Input signal VP is compared against two voltage reference points set for 0.5V and −0.5V. If the input exceeds 0.5V a "+1" level detection is indicated by OUTA. Similarly, if the input transitions below −0.5V a "−1" level detection is indicated by OUTB. Gate A1 is used to indicate a "0" level detection on OUTC. This behavior is shown in FIG. 7 as an electrical simulation of the circuit performance.

An alternate embodiment of the invention is shown in FIG. 2 as a ternary signal based data communications interface using a differential electrical connection between transmitter and receiver. The differential connection consists of two active signal lines similar to RS422 whereby the signal level is formed by a difference voltage. Input circuit 200 generates a serial binary multi-bit data stream and clock. State sequence encoder 202 takes as input two binary digits, clock and data link idle mode converting binary data into a sequential pattern of ternary symbols. The data link idle mode is used to indicate a condition where no data is available for transmission. FIG. 8 provides details as to the encoding function performed by state sequence encoder 202. A differential ternary signal consists of voltage waveforms present on a pair of active lines, each represented by any three logic voltage levels for example −1/0/1 or 0/1/2. The differential signal level is formed by the resultant difference voltage between the pair of active lines. Therefore the differential signal can represent a total of six unique states excluding three states where the pair of line voltages is equal. In this example following FIG. 8, the two binary data are represented states S1="00", S2="01", S3="10" and S4="11". Further, state S0 represents a clock phase state as described for the single ended case and state S5 is used during the data link idle mode. Sequential repetitive transmission of a single two binary digit data state utilizes a clock phase state insertion to maintain the self clocking interface operation for maximum data rate. The present invention makes use of ternary differential signaling allowing integration of interface operational controls (clock phase insertion-mode control) and doubles the data rate over a conventional binary differential link.

Idle mode is entered upon input circuit 200 asserting the idle input control on input circuit thereby indicating a no data transmission condition. During idle mode, the interface continues to self clock allowing synchronization with the next transmitted data state. Interface idle mode begins with transmission of S5 causing the receiver to recognize a no data condition. The interface will continue to transmit an alternating S5 and S0 pattern during the idle mode. Exiting of idle mode is performed by de-asserting of the idle input control by input circuit 200 indicating data transmission will continue. The next data state is transmitted breaking the idle mode pattern which upon normal operation will resume. The state diagram from FIG. 8 details transitions between idle mode and data transmission mode keyed on the S5 state. Additionally, the S0 state is used for clock phase insertion during both data transmission and idle modes.

The output states from state sequence encoder 202 are input to differential encoder 204 in order to generate a pair of binary control codes selecting the differential transmitter 206 output signals. Differential encoder 204 mapping of state to transmitter control inputs are shown in FIG. 13. Transmitter 206 generates a pair of differential ternary signals to drive transmission media 208. Differential receiver 210 takes as input the transmission media signals and converts the received differential signals into five binary output controls. Receiver output mapping to each differential signal condition is detailed in FIG. 9 including the three garble states. The five receiver control outputs are input to differential decoder 212 for mapping into state representation and garble indication. Differential decoder 212 receiver input to output state mapping logic function is shown in FIG. 14. The output signals from differential decoder 212 are input to state sequence decoder 214 for final mode detection and clock recovery. After the state and mode are determined, state sequence decoder 214 utilizes the mapping shown in FIG. 8 to output data values, idle mode indication and clock.

Ternary differential transmitter 206 shown in FIG. 2 can be constructed by the combination of two transmitter circuits shown in FIG. 5. Each transmitter circuit receives a control code for transmission from differential encoder 204 with mapping as shown in FIG. 13. One transmitter provides signaling for the P active line, while the other transmitter drives signaling on the N active line forming a differential signal.

FIG. 10 shows an example electrical circuit implementing a differential ternary receiver. The input signals VP and VN are level shifted into multiple comparator circuits each detecting a differential voltage condition. Input signal level shifting is simulated as a series fixed voltage sources effectively shifting the input signal. In this example, the minimum differential voltage for all cases is held to 0.5V for a +1V to −1V input range. The minimum differential voltage can be made larger by simply increasing both the supply and input voltage ranges then re-biasing the level shifters. This operation of the FIG. 10 circuit is shown in FIG. 11 as an electrical simulation of performance. The results in FIG. 11 closely match the waveforms shown in FIG. 9.

Another alternate embodiment of the present invention is shown in FIG. 3 describing a parallel data communication interface implementation. Input circuit 300 generates a parallel binary multi-bit data stream, clock and idle mode control. Binary to ternary 302 translates the binary twelve digit field into an equivalent ternary eight digit field for input to ternary transmitter group 304. In this example, the twelve binary digits take 4096 logic combinations to represent while the eight ternary digits can provide 6561 logic combinations per FIG. 12. In a manner similar to the differential serial data interface described above, these non-used ternary codes can be used to implement clock phase state and idle mode state insertion into the data stream. The clock phase state insertion provides for a self clocking interface. Idle mode can be asserted by the interface transmitting side input circuit when no data is available for transmission. FIG. 8 can be interpreted to show a possible implementation for a two binary digit parallel interface with extended application to this example of twelve binary digits. In order to implement a larger group of twelve binary digits, the number of states would need to be increased to 4096 with two additional states representing clock and idle states. An implementation example of transmitter group 304 would consist of eight identical single ended transmitter circuits shown in FIG. 5. Each transmitter 304 drives signaling onto parallel transmission media 306 to be received by receiver group 308. Similarly, receiver group 308 could be constructed with eight identical single ended receiver circuits shown in FIG. 6. Each receiver translates the ternary signaling input into three binary detection signals. These eight groups of detection signals is input to ternary to binary decoder 310 for recovery of the 12-bit data values, idle mode indication and clock. Alternatively, transmitter group 304 and receiver group 308 could be realized utilizing differential type circuits depending on the application. Usage of ternary signaling for the parallel interface also serves to reduce the number of transmission media lines compared to a binary implementation. This reduction is the required number of transmission lines is shown for binary interface widths up to 32 bits in FIG. 12. The specific example parallel interface described effectively maps 12 binary digits onto a physical 8 digit ternary bus.

Another alternate embodiment of the present invention would add an addressing information capability to the parallel interface described above. This embodiment would add a group of address lines from input circuit 300 as input to encoder 302. Activation of these address lines would cause encoder 302 to output address states implemented as part of remaining unused ternary states similar to the idle mode state. Functionality would be added to decoder 308 to detect the address states. The address information would be output on a new set of address lines added to decoder 310.

Having described my invention, I claim:

1. A single ended ternary logic based data communication interface system comprising:
 a. an input circuit generating a binary serial data stream;
 b. a state sequence encoder coupled to the input circuit, the state sequence encoder generating a sequence of binary data and clock state information in response to the input circuit generating the binary serial data stream;
 C. a single ended transmitter coupled to the state sequence encoder, the single ended transmitter generating a sequence of ternary level logic signal in response to the state sequence encoder generating the sequence of binary data and clock state information;
 d. a signal transmission media coupled to the single ended transmitter, the signal transmission media propagating the ternary level logic signal in response to the single ended transmitter generating the ternary level logic signal;
 e. a single ended receiver coupled to the signal transmission media, the single ended receiver generating the sequence of binary data and clock states in response to the signal transmission media propagating the ternary level logic signal;
 f. a state sequence decoder coupled to the single ended receiver, the state sequence decoder generating the binary serial data stream in response to the single ended receiver generating the sequence of binary data and clock states;
 g. wherein the state sequence encoder is configured to inject clock phase state information into the binary serial data stream; and
 h. wherein the state sequence decoder is configured to remove clock phase state information from the binary serial data stream.

2. The system of claim 1, wherein the signal transmission media consists of wire.

3. The system of claim 1, wherein the signal transmission media consists of traces on a circuit board.

4. The system of claim 1, wherein the signal transmission media consists of free space.

5. The system of claim 1, wherein the signal transmission media consists of fiber optic.

6. A differential ternary logic based data communication interface system comprising:
 a. an input circuit generating a serial data stream;

b. a state sequence encoder coupled to the input circuit, the state sequence encoder generating a sequence of state information in response to the input circuit generating the serial data stream;
C. a differential encoder coupled to the state sequence encoder, the differential encoder generating a sequence of control information in response to the state sequence encoder generating the sequence of state information;
d. a differential transmitter coupled to the differential encoder, the differential transmitter generating a sequence of ternary logic signals in response to the differential encoder generating the sequence of control information;
e. a signal transmission media coupled to the differential transmitter, the signal transmission media propagating the ternary logic signals in response to the differential transmitter generating the sequence of ternary logic signals;
f. a differential receiver coupled to the signal transmission media, the differential receiver generating a sequence of control information in response to the signal transmission media propagating the ternary logic signals;
g. a differential decoder coupled to the differential receiver, the differential decoder generating a sequence of states in response to the differential receiver generating the sequence of control information;
h. a state sequence decoder coupled to the differential decoder, the state sequence decoder generating the serial data stream in response to the differential decoder generating the sequence of states;
i. wherein the state sequence encoder is configured to inject clock phase state and idle mode state information into the serial data stream; and
j. wherein the state sequence decoder is configured to remove the clock phase state and the idle mode state information from the serial data stream.

7. The system of claim 6, wherein the signal transmission media consists of wire.

8. The system of claim 6, wherein the signal transmission media consists of traces on a circuit board.

9. A parallel ternary logic based data communication interface system comprising:
a. an input circuit generating a parallel data stream;
b. a parallel encoder coupled to the input circuit, the parallel encoder generating a sequence of control information in response to the input circuit generating the parallel data stream;
C. a single ended transmitter group coupled to the parallel encoder, the single ended transmitter group generating a sequence of ternary logic signals in response to the parallel encoder generating the sequence of control information;
d. a signal transmission media coupled to the single ended transmitter group, the signal transmission media propagating the ternary logic signals in response to the single ended transmitter group generating the sequence of ternary logic signals;
e. a single ended receiver group coupled to the signal transmission media, the single ended receiver group generating a sequence of control information in response to the signal transmission media propagating the ternary logic signals;
f. a parallel decoder coupled to the single ended receiver group, the parallel decoder generating the parallel data stream in response to the single ended receiver group generating the sequence of control information;
g. wherein the parallel encoder is configured to inject clock phase state and idle mode state information into the serial data stream; and
h. wherein the parallel decoder is configured to remove the clock phase state and the idle mode state information from the serial data stream.

10. The system of claim 9, wherein the transmitter and receiver group are configured to operate on differential signaling.

11. The system of claim 9, wherein the parallel encoder and parallel decoder are configured to operate on address information.

* * * * *